United States Patent [19]

Ebara et al.

[11] Patent Number: 5,608,018
[45] Date of Patent: Mar. 4, 1997

[54] α-OLEFIN POLYMERIZATION CATALYST SYSTEM AND PROCESS FOR PRODUCING α-OLEFIN CATALYST

[75] Inventors: Takeshi Ebara; Teruyosi Kiyota; Akio Imai, all of Ichihara, Japan

[73] Assignee: Sumitomo Chemical Company, Limited, Osaka, Japan

[21] Appl. No.: 350,158

[22] Filed: Nov. 30, 1994

[30] Foreign Application Priority Data

Dec. 8, 1993 [JP] Japan ................................. 5-308029

[51] Int. Cl.$^6$ ............................ C08F 4/651; C08F 4/654; C08F 10/00
[52] U.S. Cl. ...................... 526/119; 502/110; 502/115; 502/116; 502/126; 526/351
[58] Field of Search ................................... 502/110, 116, 502/115, 126; 526/119

[56] References Cited

U.S. PATENT DOCUMENTS

| | | |
|---|---|---|
| 4,672,050 | 6/1987 | Sasaki et al. . |
| 4,743,665 | 5/1988 | Sasaki et al. . |
| 4,771,023 | 9/1988 | Sasaki et al. . |
| 4,891,411 | 1/1990 | Sasaki et al. . |
| 4,983,561 | 1/1991 | Sasaki et al. . |

FOREIGN PATENT DOCUMENTS

| | | |
|---|---|---|
| 376084 | 12/1989 | European Pat. Off. . |
| 0376084 | 7/1990 | European Pat. Off. . |
| 2-283703 | 11/1990 | Japan . |
| 1564460 | 4/1980 | United Kingdom . |

*Primary Examiner*—Edward J. Smith
*Attorney, Agent, or Firm*—Watson Cole Stevens Davis, P.L.L.C.

[57] ABSTRACT

An α-olefin polymerization catalyst system having so high a catalytic activity and stereoregularity that the catalyst residue and amorphous polymer need not be removed and a process for producing anα-olefin polymer using the catalyst system, said catalyst system consisting essentially of:

(A) a trivalent titanium compound-containing solid catalyst component prepared by reducing a titanium compound, represented by the general formula Ti(OR$^1$)$_a$X$_{4-a}$ in which R$^1$ represents a hydrocarbon group having 1 to 20 carbon atoms; X represents a halogen atom; and a represents a numeral satisfying 0<a≦4, with an organomagnesium compound in the presence of Si-O bond-containing organosilicon compound and an ester compound (a) to obtain a solid product, treating the solid product with an ester compound (b) to obtain an ester-treated solid product, and treating the ester-treated solid product with a mixture of an ether compound and titanium tetrachloride or a mixture of an ether compound, titanium tetrachloride and an ester compound (c), wherein the ester compounds (a), (b) and (c) may be the same or different from one another;

(B) an organoaluminum compound and
(C) an electron donative compound.

23 Claims, 1 Drawing Sheet

α-OLEFIN POLYMERIZATION CATALYST SYSTEM AND PROCESS FOR PRODUCING α-OLEFIN CATALYST

BACKGROUND OF THE INVENTION

This invention relates to an α-olefin polymerization catalyst system, a process for producing an α-olefin polymer using the same, a solid catalyst component for an α-olefin polymerization, and a process for preparing the same. More particularly, it relates to a novel polymerization catalyst system for polymerizing an α-olefin which has a very high catalytic activity per solid catalyst and per titanium atom and to a process for producing a highly stereoregular α-olefin polymer which contains little catalyst residue and little amorphous polymer and which has excellent mechanical properties and excellent processability using the above novel catalyst system.

In the production of a polymer of an α-olefin such as propylene, butene-1 or the like, it is well-known to use a Ziegler-Natta catalyst consisting of a transition metal compound of Group IV to VI of the Periodic Table and an organometallic compound of Groups I to III of the Periodic Table.

In the production of an α-olefin polymer, amorphous polymers are produced as by-products in addition to a highly stereoregular α-olefin polymer which has a high industrial utilization value. Said amorphous polymer is low in industrial utilization value and adversely affects on the mechanical properties required in molding the α-olefin polymer into a molded article, film, fiber, other processings and using the same. Also, the formation of amorphous polymer brings about the loss of the starting monomers and requires an equipment for removing the amorphous polymer. This is very disadvantageous in industry. Accordingly, the catalyst system for producing an α-olefin polymer is required to produce no or little, if any, such amorphous polymer. Furthermore, in the α-olefin polymer obtained, there remains a catalyst residue consisting of the transition metal compound and the organometallic compound. This catalyst residue causes problems in various respects such as stability, processability and the like of the α-olefin polymer, and hence, it becomes necessary to provide an equipment for removal of the catalyst residue and stabilization of polymer.

The above disadvantage can be overcome by increasing the catalytic activity represented by the weight of the α-olefin polymer produced per unit weight of catalyst, whereby the equipment for removing the above catalyst residue becomes unnecessary and the cost for producing the α-olefin polymer can be reduced.

It is known that when a Ti—Mg complex type solid catalyst obtained by reducing a tetravalent titanium compound with an organomagnesium compound in the presence of an organosilicon compound to form a magnesium-titanium eutectic mixture is used in combination with a cocatalyst organoaluminum compound and an organosilicon compound as the third component used in the polymerization, highly active, highly stereo-selective polymerization of an α-olefin can be realized to some extent (see JP-B-3-43,283 and JP-A-1-319,508).

These cases are in such a level that the realization of an extraction-free, deashing-free process is possible to some extent; however, a further improvement has been desired.

Specifically, in order to make the quality of α-olefin polymer higher, it has been desired to realize a higher stereoselective polymerization without sacrificing the particle size distribution and the like. In particular, in uses in which it is desired for a polymer to have a higher stiffness as in the field of molding, the appearance of a catalyst having a high stereoregular polymerization ability and a good particle size distribution has been earnestly desired because a high stereoregularity of the polymer directly results in a high stiffness product.

SUMMARY OF THE INVENTION

Under such circumstances, the present inventors have made extensive research to find a novel catalyst system which can solve the above problems.

An object of this invention is to provide an α-olefin polymerization catalyst system and a solid catalyst component in the catalyst system having a good particle size distribution and so high a catalytic activity and stereospecifity that the removal of catalyst residue and amorphous polymer becomes unnecessary, and to provide a process for preparing the solid catalyst component.

A further object of this invention is to provide a process for producing a highly stereoregular α-olefin polymer having a high quality.

Other objects and advantages of this invention will become apparent from the following description and the accompanying drawings.

According to this invention, there is provided an α-olefin polymerization catalyst system consisting essentially of:

(A) a trivalent titanium compound-containing solid catalyst component prepared by reducing a titanium compound, represented by the general formula $Ti(OR^1)_a X_{4-a}$ in which $R^1$ represents a hydrocarbon group having 1 to 20 carbon atoms; X represents a halogen atom; and a represents a numeral satisfying $0<a\leq4$, with an organomagnesium compound in the presence of Si-O bond-containing organosilicon compound and an ester compound (a) to obtain a solid product, treating the solid product with an ester compound (b) to obtain an ester-treated solid product, and treating the ester-treated solid product with a mixture of an ether compound and a titanium tetrachloride or a mixture of an ether compound, titanium tetrachloride and an ester compound (c), wherein the ester compounds (a), (b), and (c) may be the same or different from one another;

(B) an organoaluminum compound; and (C) an electron donative compound.

According to this invention, there is further provided a process for producing the above-mentioned catalyst component (A) and an α-olefin polymer comprising homopolymerizing or copolymerizing at least one α-olefin with the above-mentioned catalyst system, the above-mentioned solid catalyst component (A), and a process for preparing the solid catalyst component (A).

Figure 1:
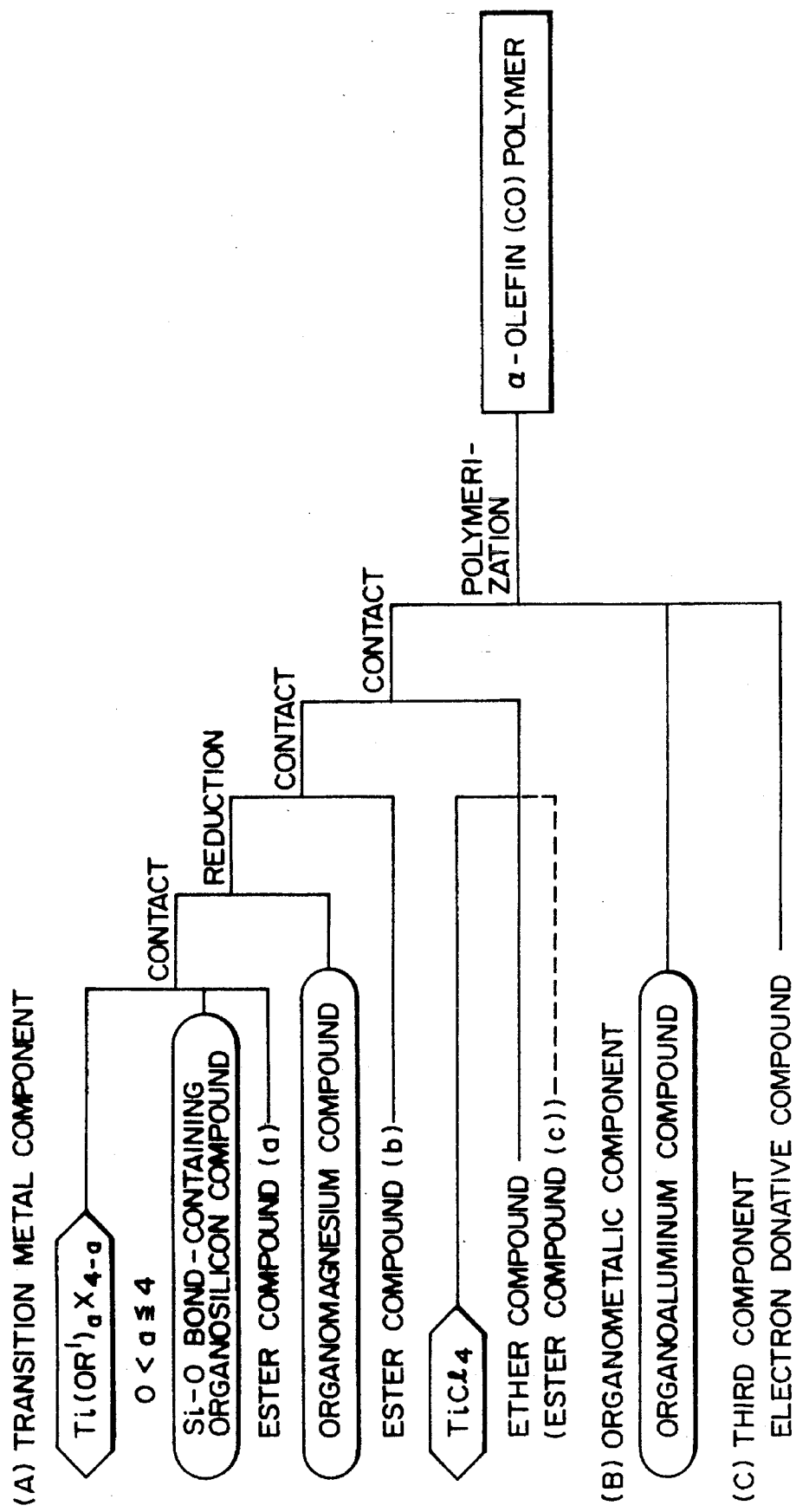
FIG. 1 is a flow chart for facilitating the understanding of this invention, said flow chart being a representative of the embodiments of this invention.

DETAILED DESCRIPTION OF THE INVENTION (a) Titanium compound

The titanium compound used in the synthesis of the solid catalyst component (A) of this invention includes titanium compounds represented by the general formula $Ti(OR^1)_a X_{4-a}$ in which $R^1$ represents a hydrocarbon group having 1 to 20 carbon atoms, X represents a halogen atom and a represents a numeral satisfying $0<a\leq 4$. Specific examples of $R^1$ include alkyl groups such as methyl, ethyl, propyl, isopropyl, butyl, isobutyl, t-butyl, amyl, isoamyl, t-amyl, hexyl, heptyl, octyl, decyl, dodecyl and the like; aryl groups such as phenyl, cresyl, xylyl, naphthyl and the like; alkenyl groups such as propenyl and the like; and aralkyl groups such as benzyl and the like. Among them, alkyl groups having 2 to 18 carbon atoms and aryl groups having 6 to 18 carbon atoms are preferred. Straight chain alkyl groups having 2 to 18 carbon atoms are particularly preferred. Also, it is possible to use a titanium compound having at least two different $OR^1$ groups.

The halogen atom represented by X in the above general formula includes chlorine, bromine and iodine, and chlorine gives particularly preferable results among them.

The symbol a in the general formula $Ti(OR^1)_a X_{4-a}$ represents a numeral satisfying $0<a\leq 4$, preferably $2\leq a\leq 4$, particularly preferably $a=4$.

The synthesis of the titanium compound represented by the general formula $Ti(OR^1)_a X_{4-a}$ can be carried out by a known method. For example, a method in which $Ti(OR^1)_4$ and $TiX_4$ are reacted in the predetermined proportion or a method in which $TiX_4$ and a corresponding alcohol ($R^1OH$) are reacted in the predetermined amounts can be used. Also, these titanium compounds may be used in dilution with a hydrocarbon compound, a halogenated hydrocarbon compound or the like.

Specifically, there may be mentioned alkoxytitanium trihalide compounds such as methoxytitanium trichloride, ethoxytitanium trichloride, butoxytitanium trichloride, phenoxytitanium trichloride, ethoxytitanium tribromide and the like; dialkoxytitanium dihalide compounds such as dimethoxytitanium dichloride, diethoxytitanium dichloride, dibutoxytitanium dichloride, diphenoxytitanium dichloride, diethoxytitanium dibromide and the like; trialkoxytitanium monohalide compounds such as trimethoxytitnaium chloride, triethoxytitanium chloride, tributoxytitanium chloride, triphenoxytitanium chloride, triethoxytitanium bromide and the like; and tetraalkoxytitanium compounds such as tetramethoxytitanium, tetraethoxytitanium, tetrabutoxytitanium, tetraphenoxytitanium and the like.

(b) Si—O bond containing organosilicon compound

As the Si—O bond containing organosilicon compound used in the synthesis of the solid catalyst component (A) of this invention, there may be used compounds represented by the following general formulas:

$$Si(OR^2)_m R^3_{4-m},$$

$$R^4(R^5_2 SiO)_p SiR^6_3$$

and $$(R^7_2 SiO)_q$$

wherein $R^2$ represents a hydrocarbon group having 1 to 20 carbon atoms; $R^3$, $R^4$, $R^5$, $R^6$ and $R^7$ are hydrocarbon groups having 1 to 20 carbon atoms or hydrogen atoms; m is a numeral satisfying $0<m\leq 4$; p is an integer of 1 to 1,000; and q is an integer of 2 to 1,000.

Specific examples of such organosilicon compounds include tetramethoxysilane, dimethyldimethoxysilane, tetraethoxysilane, triethoxyethylsilane, diethoxydiethylsilane, ethoxytriethylsilane, tetraisopropoxysilane, diisopropoxydiisopropylsilane, tetrapropoxysilane, dipropoxydipropylsilane, tetrabutoxysilane, dibutoxydibutylsilane, dicyclopentyloxydiethylsilane, diethoxydiphenylsilane, cyclohexyloxytrimethylsilane, phenoxytrimethylsilane, tetraphenoxysilane, triethoxyphenylsilane, hexamethyldisiloxane, hexaethyldisiloxane, hexapropyldisiloxane, octaethyltrisiloxane, dimethylpolysiloxane, diphenylpolysiloxane, diphenylpolysiloxane, methylhydropolysiloxane, phenylhydropolysiloxane and the like.

Among these organosilicon compounds, preferable are alkoxysilane compounds represented by the general formula $Si(OR^2)_m R^3_{4-m}$ in which m is preferably a numeral satisfying $1\leq m\leq 4$, particularly preferably $m=4$, namely tetraalkoxysilane compounds.

(c) Ester compound

The ester compounds (a), (b), and (c) used in the synthesis of the solid catalyst component (A) of this invention include mono- and polycarboxylic acid esters, for example, aliphatic carboxylic acid esters, unsaturated aliphatic carboxylic acid esters, alicyclic carboxylic acid esters and aromatic carboxylic acid esters. Specific examples thereof include methyl acetate, ethyl acetate, phenyl acetate, methyl propionate, ethyl propionate, ethyl butyrate, ethyl valerate, methyl acrylate, ethyl acrylate, methyl methacrylate, ethyl benzoate, butyl benzoate, methyl toluate, ethyl toluate, ethyl anisate, diethyl succinate, dibutyl succinate, diethyl malonate, dibutyl malonate, dimethyl maleate, dibutyl maleate, diethyl itaconate, dibutyl itaconate, monoethyl phthalate, dimethyl phthalate, methyl ethyl phthalate, diethyl phthalate, di-n-propyl phthalate, diisopropyl phthalate, di-n-butylphthalate, diisobutyl phthalate, di-n-octyl phthalate, diphenyl phthalate and the like.

Among these ester compounds, olefinic carboxylic acid esters such as methacrylic acid esters, maleic acid esters and the like and phthalic acid esters are preferred, and diesters of phthalic acid are particularly preferably used.

The ester compounds (a), (b), and (c) may be the same or different from one another.

(d) Organomagnesium compound

The organomagnesium compound used in the synthesis of the solid catalyst component (A) of this invention may be any type of organomagnesium compounds having a Mg-carbon bond. In particular, Grignard compounds represented by the general formula $R^8MgX$ in which $R^8$ represents a hydrocarbon group having 1 to 20 carbon atoms and X represents a halogen atom and dialkylmagnesium compounds or diarylmagnesium compounds represented by the general formula $R^9R^{10}Mg$ in which $R^9$ and $R^{10}$ represent independently hydrocarbon groups having 1 to 20 carbon atoms are particularly suitably used. In the above formulas, $R^8$, $R^9$ and $R^{10}$ may be the same as or different from one another and include alkyl, alkenyl, aryl and aralkyl groups having up to 20 carbon atoms such as methyl, ethyl, propyl, isopropyl, butyl, sec-butyl, amyl, isoamyl, hexyl, octyl, 2-ethylhexyl, phenyl, benzyl and the like.

Specifically, the Grignard compounds include methylmagnesium chloride, ethylmagnesium chloride, ethylmagnesium bromide, ethylmagnesium iodide, propylmagnesium chloride, propylmagnesium bromide, butylmagnesium chloride, butylmagnesium bromide, sec-butylmagnesium chloride, sec-butylmagnesium bromide, tert-butylmagnesium chloride, tert-butylmagnesium bromide, amylmagnesium chloride, isoamylmagnesium chloride, hexylmagnesium chloride, phenylmagnesium chloride, phenylmagnesium bromide and the like, and the compounds represented by the general formula $R^9R^{10}Mg$ include dimethylmagnesium, diethylmagnesium, dipropylmagnesium, diisopropylmagnesium, dibutylmagnesium, di-sec-butylmagnesium, di-tert-butylmagnesium, butyl-sec-butylmagnesium, diamylmagnesium, dihexylmagnesium, diphenylmagnesium, butylethylmagnesium and the like.

In the synthesis of the above organomagnesium compound, there may be used a solvent, for example, an ether solvent such as diethyl ether, dipropyl ether, diisopropyl ether, dibutyl ether, diisobutyl ether, diamyl ether, diisoamyl ether, dihexyl ether, dioctyl ether, diphenyl ether, dibenzyl ether, phenetole, anisole, tetrahydrofuran, tetrahydropyran or the like; a hydrocarbon solvent such as hexane, heptane, octane, cyclohexane, methylcyclohexane, benzene, toluene, xylene or the like; or a mixed solvent of the ether solvent and the hydrocarbon solvent.

The organomagnesium compound is preferably used in the form of an ether solution, and in this case, the ether compound may be an ether compound having 6 or more carbon atoms in the molecule or an cyclic structure-containing ether compound. In view of the catalytic activity, it is particularly preferable to use an ether solution of the Grignard compound represented by the general formula $R^8MgX$.

It is also possible to use a hydrocarbon-soluble complex of the above organomagnesium compound with an organometallic compound. Examples of such an organometallic compound include organic compounds of Li, Be, B, Al and Zn.

(e) Ether compound

The ether compound used in the synthesis of the solid catalyst component (A) of this invention includes dialkyl ethers such as diethyl ether, dipropyl ether, diisopropyl ether, dibutyl ether, diisobutyl ether, diamyl ether, diisoamyl ether, dineopentyl ether, dihexyl ether, dioctyl ether, methyl butyl ether, methyl isoamyl ether, ethyl isobutyl ether and the like. Among them, dibutyl ether and diisoamyl ether are particularly preferably used.

(f) Synthesis of solid catalyst component (A)

The solid catalyst component (A) of this invention is synthesized by treating with the ester compound (b) the solid product obtained by reducing the titanium compound with the organomagnesium compound in the presence of the organosilicon compound and the ester compound (a), and then treating the ester compound-treated solid product with a mixture of the ether compound and titanium tetrachloride or a mixture of the ether compound, titanium tetrachloride and the ester compound (c). All the above synthesis reactions are carried out in an inert gas atmosphere such as an atmosphere of nitrogen, argon or the like.

The reduction reaction of the titanium compound with the organomagnesium compound may be carried out either by a method in which the organomagnesium compound is added to the mixture of the titanium compound, the organosilicon compound and the ester compound (a) or a method in which inversely, a mixture of the titanium compound, the organosilicon compound and the ester compound (a) is added to a solution of the organomagnesium compound. Among them, the method in which the organomagnesium compound is added to the mixture of the titanium compound, the organosilicon compound and the ester compound (a) is preferred from the viewpoint of catalytic activity.

The titanium compound, the organosilicon compound and the ester compound (a) are preferably used in the form of solution in or dilution with a suitable solvent. Such a solvent includes aliphatic hydrocarbons such as hexane, heptane, octane, decane and the like; aromatic hydrocarbons such as toluene, xylene and the like; alicyclic hydrocarbons such as cyclohexane, methylcyclohexane, decalin and the like; and ether compounds such as diethyl ether, dibutyl ether, diisoamyl ether, tetrahydrofuran and the like.

The reduction reaction temperature is preferably in the range of $-50°$ to $+70°$ C., more preferably $-30°$ to $50°$ C. and most preferably $-25°$ to $+35°$ C. When the reduction reaction temperature is too high, the catalytic activity becomes low.

In the synthesis of the solid product by reduction reaction, it is possible to allow a porous material such as a porous inorganic oxide, a porous organic polymer or the like to exist to impregnate the porous material with the resulting solid product. Such a porous material has preferably a pore volume of 0.3 ml/g or more in the pore radius range of 20 to 200 nm.

The porous inorganic oxide includes $SiO_2$, $Al_2O_3$, MgO, $TiO_2$, $ZrO_2$, $SiO_2 \cdot Al_2O_3$ complex oxide, $MgO \cdot Al_2O_3$ complex oxide, $MgO \cdot SiO_2 \cdot Al_2O_3$ complex oxide and the like. Also, the porous polymer includes porous polymers of polystyrene type, polyacrylic acid ester type, polyacrylonitrile type, polyvinyl chloride type and polyolefin type such as polystyrene, styrene-divinylbenzene copolymer, styrene-N,N'-alkylene dimethacrylamide copolymer, styrene-methyl ethyleneglycoldimethacrylate copolymer, polyethyl acrylate, methyl acrylate-divinylbenzene copolymer, ethyl acrylate-divinylbenzene copolymer, polymethyl methacrylate, methyl methacrylate-divinylbenzene copolymer, polymethyl ethyleneglycoldimethacrylate, polyacrylonitrile, acrylonitrile-divinylbenzene copolymer, polyvinyl chloride, polyvinyl pyrrolidone, polyvinylpyridine, ethylvinylbenzene-divinylbenzene copolymer, polyethylene, ethylene-methyl acrylate copolymer, polypropylene and the like. Among these porous materials, there are preferably used $SiO_2$, $Al_2O_3$ and styrene-divinylbenzene copolymer.

In the reduction of the titanium compound, the organomagnesium compound may be added by a dropwise addition.

The dropwise addition time is not critical; however, it is preferably about 30 minutes to about 12 hours. After completion of the reduction reaction, post reaction may further be conducted at a temperature of 20 to 120° C.

The amount of the organosilicon compound used is preferably 1 to 50, more preferably 3 to 30 and most preferably 5 to 25, in terms of an atomic ratio of the silicon atom to the titanium atom of the titanium compound (Si/Ti). Also, the amount of the ester compound (a) used is preferably 0.05 to 10, more preferably 0.1 to 6 and most preferably 0.2 to 3 in terms of the molar ratio of the ester compound (a) to the titanium atom of the titanium compound (ester compound (a)/Ti). Moreover, the amount of the organomagnesium compound is preferably 0.1 to 10, more preferably 0.2 to 5.0 and most preferably 0.5 to 2.0 in terms of the atomic ratio of the sum of titanium atom and silicon atom to the magnesium atom [(Ti+Si)/Mg].

The solid product obtained by the reduction reaction is subjected to solid-liquid separation and then washing several times with an inert hydrocarbon solvent such as hexane, heptane or the like. The solid product thus obtained contains trivalent titanium, magnesium and hydrocarbyloxy group and is generally noncrystalline or very weakly crystalline. From the viewpoint of catalytic activity, the noncrystalline structure is particularly preferred.

Subsequently, the solid product obtained by the abovementioned method is treated with the ester compound (b). The amount of the ester compound (b) used is preferably 0.1 to 50 moles, more preferably 0.3 to 20 moles and most preferably 0.5 to 10 moles, per mole of the titanium atom in the solid product. Also, the amount of the ester compound (b) used is preferably 0.01 to 1.0 mole, more preferably 0.03 to 0.5 mole, per mole of the magnesium atom in the solid product. When the amount of the ester compound (b) used is too large, the degradation of particles is caused.

The treatment of the solid product with the ester compound (b) can be effected by any of the known methods capable of contacting the solid product and the ester compound such as a slurry method or a mechanical pulverization means by a ball mill or the like; however, when the mechanical pulverization is applied, finely ground particles from the solid catalyst component are formed in a large amount, and the particle size distribution becomes broad, which is not desirable from the industrial point of view. It is preferable to contact the two in the presence of a diluent.

As the diluent, there can be used aliphatic hydrocarbons such as pentane, hexane, heptane, octane and the like; aromatic hydrocarbons such as benzene, toluene, xylene and the like; alicyclic hydrocarbons such as cyclohexane, cyclopentane and the like; halogenated hydrocarbons such as 1,2-dichloroethane, monochlorobenzene and the like. Among them, the aromatic hydrocarbons and the halogenated hydrocarbons are particularly preferred.

The amount of the diluent used is preferably 0.1 ml to 1,000 ml, more preferably 1 ml to 100 ml, per gram of the solid product. The treatment temperature is preferably −50° to +150° C., more preferably 0° to 120° C. The treatment time is preferably five minutes or more, more preferably fifteen minutes to three hours. After completion of the treatment, the treated solid product is allowed to stand to separate the solids from the liquid, after which the solids are washed several times with an inert hydrocarbon solvent to obtain the ester-treated solids.

Subsequently, the ester-treated solids are treated with the mixture of the ether compound and titanium tetrachloride. This treatment is preferably conducted in the slurry state. The solvent which can be used in the formation of the slurry includes aliphatic hydrocarbons such as pentane, hexane, heptane, octane, decane and the like; aromatic hydrocarbons such as toluene, xylene and the like; alicyclic hydrocarbons such as cyclohexane, methylcyclohexane, decalin and the like; and halogenated hydrocarbons such as dichloroethane, trichloroethylene, monochlorobenzene, dichlorobenzene, trichlorobenzene and the like. Among them, the halogenated hydrocarbons and aromatic hydrocarbons are preferred.

The slurry concentration is preferably 0.05 to 0.7 g solids/ml solvent, more preferably 0.1 to 0.5 g solids/ml solvent. The reaction temperature is preferably 30° to 150° C., more preferably 45° to 135° C., and most preferably 60° to 120° C. The reaction time is not critical; however, a period of about thirty minutes to about six hours is usually suitable.

The feeding of the ester-treated solids, the ether compound and titanium tetrachloride may be effected by either the method in which the ether compound and titanium tetrachloride are added to the ester-treated solids or the method in which the ester-treated solids are inversely added to a solution of the ether compound and titanium tetrachloride. In the method in which the ether compound and titanium tetrachloride are added to the ester-treated solids, it is preferable to add titanium tetrachloride after the addition of the ether compound or simultaneously add the ether compound and titanium compound, and it is more preferable to add a previously prepared mixture of the ether compound and titanium tetrachloride to the ester-treated solids.

The reaction of the ester-treated solids with the ether compound and titanium tetrachloride may be repeated two times or more. From the viewpoint of the catalytic activity and stereoregularity, it is preferable to repeat at least two times the reaction with the mixture of the ether compound and titanium tetrachloride.

The amount of the ether compound used is preferably 0.1 to 100 moles, more preferably 0.5 to 50 moles and most preferably 1 to 20 moles, per mole of the titanium atom contained in the solid product. The amount of titanium tetrachloride added is preferably 1 to 1,000 moles, more preferably 3 to 500 moles and most preferably 10 to 300 moles, per mole of the titanium atom contained in the solid product. The amount of titanium tetrachloride added per mole of the ether compound is preferably 1 to 100 moles, more preferably 1.5 to 75 moles and most preferably 2 to 50 moles.

In the treatment of the ester-treated solids with a mixture of the ether compound and titanium tetrachloride, the ester compound (c) may be allowed to coexist. In this case, the amount of the ester compound (c) used is preferably 30 moles or less, more preferably 15 moles or less and most preferably 5 moles or less, per mole of the titanium atom contained in the solid product.

The trivalent titanium compound-containing solid catalyst component obtained by the above-mentioned method is subjected to solid-liquid separation and thereafter to washing with an inert hydrocarbon solvent such as hexane, heptane or the like several times, after which the solid catalyst component is used in polymerization. From the viewpoint of catalytic activity and stereoregularity, it is preferable that after the solid-liquid separation, the solid catalyst component is washed at least one time with a large amount of a halogenated hydrocarbon solvent such as monochlorobenzene or the like or an aromatic hydrocarbon solvent such as toluene or the like at a temperature of 50° to 120° C., then further washed repeatedly several times with an aliphatic hydrocarbon solvent such as hexane or the like, and thereafter used in polymerization.

(g) Organoaluminum compound (B)

The organoaluminum compound used in this invention has at least one Al-carbon bond in the molecule. Representatives thereof are organoaluminum compounds represented by the following general formulas:

$$R^{11}_\gamma AlY_{3-\gamma}$$

and

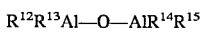

$$R^{12}R^{13}Al\text{—}O\text{—}AlR^{14}R^{15}$$

wherein $R^{11}$ to $R^{15}$ represent independently hydrocarbon groups having 1 to 20 carbon atoms; Y represents a halogen atom, a hydrogen atom or an alkoxy group and $\gamma$ represents a numeral satisfying $2 \leq \gamma \leq 3$, and include trialkylaluminums such as triethylaluminum, triisobutylaluminum, trihexylaluminum and the like; dialkylaluminum hydrides such as diethylaluminum hydride, diisobutylaluminum hydride and the like; dialkylaluminum halides such as diethylaluminum chloride and the like; mixtures of a trialkylaluminum and a dialkylaluminum halide such as a mixture of triethylaluminum and diethylaluminum chloride and the like; alkylaluminoxanes such as tetraethyldialuminoxane, tetrabutyldialuminoxane and the like.

Among these organoaluminum compounds, preferred are trialkylaluminums, mixtures of a trialkylaluminum and a dialkylaluminum halide and alkylaluminoxanes, and particularly preferable are triethylaluminum, triisobutylaluminum, a mixture of triethylaluminum and diethylaluminum chloride and tetraethyldialuminoxane.

The amount of the organoaluminum compound used may be in so broad a range as 0.5 to 1,000 moles per mole of the titanium atom contained in the solid catalyst component; however, it is particularly preferably in a range of 1 to 600 moles.

(h) Electron donative compound (C)

The electron donative compound contained in the catalyst system of this invention includes oxygen-containing electron donors such as alcohols, phenols, ketones, aldehydes, carboxylic acids, esters of organic and inorganic acids, ethers, acid amides, acid anhydrides and the like; nitrogen-containing electron donors such as ammonias, amines, nitriles, isocyanates and the like; etc. Among these electron donors, preferred are esters of inorganic acids and ethers.

The esters of inorganic acids are preferably silicon compounds represented by the general formula $R^{16}{}_nSi(OR^{17})_{4-n}$ in which $R^{16}$ represents a hydrocarbon group having 1 to 20 carbon atoms or a hydrogen atom; $R^{17}$ represents a hydrocarbon group having 1 to 20 carbon atoms; $R^{16}$ and $R^{17}$ may be different in the same ester molecule; and n represents a numeral satisfying $0 \leq n < 4$. Specific examples thereof include tetramethoxysilane, tetraethoxysilane, tetrabutoxysilane, tetraphenoxysilane, methyltrimethoxysilane, ethyltrimethoxysilane, butyltrimethoxysilane, isobutyltrimethoxysilane, tert-butyltrimethoxysilane, isopropyltrimethoxysilane, cyclohexyltrimethoxysilane, phenyltrimethoxysilane, vinyltrimethoxysilane, dimethyldimethoxysilane, diethyldimethoxysilane, dipropyldimethoxysilane, propylmethyldimethoxysilane, diisopropyldimethoxysilane, dibutyldimethoxysilane, diisobutyldimethoxysilane, di-tert-butyldimethoxysilane, butylmethyldimethoxysilane, butylethyldimethoxysilane, tert-butylmethyldimethoxysilane, tert-butylethyldimethoxysilane, tert-butyl-n-propyldimethoxysilane, isobutylisopropyldimethoxysilane, tert-butylisopropyldimethoxysilane, tert-butyl-n-butyldimethoxysilane, tert-butyl-isobutyldimethoxysilane, tert-butyl-sec-butyldimethoxysilane, hexylmethyldimethoxysilane, hexylethyldimethoxysilane, dodecylmethyldimethoxysilane, dicyclopentyldimethoxysilane, cyclopentylmethyldimethoxysilane, cyclopentylethyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, vinylmethyldimethoxysilane, methyltriethoxysilane, ethyltriethoxysilane, butyltriethoxysilane, isobutyltriethoxysilane, tert-butylethoxysilane, isopropyltriethoxysilane, cyclohexyltriethoxysilane, phenyltriethoxysilane, vinyltriethoxysilane, dimethyldiethoxysilane, diethyldiethoxysilane, dipropyldiethoxysilane, propylmethyldiethoxysilane, diisopropyldiethoxysilane, dibutyldiethoxysilane, diisobutyldiethoxysilane, di-tert-butyldiethoxysilane, butylmethyldiethoxysilane, butylethyldiethoxysilane, tert-butylmethyldiethoxysilane, heyxlmethyldiethoxysilane, hexylethyldiethoxysilane, dodecylmethyldiethoxysilane, dicyclopentyldiethoxysilane, dicyclohexyldiethoxysilane, cyclohexylmethyldiethoxysilane, cyclohexylethyldiethoxysilane, diphenyldiethoxysilane, phenylmethyldiethoxysilane, vinylmethyldiethoxysilane, ethyltriisopropoxysilane, vinyltributoxysilane, phenyltri-tert-butylsilane, 2-norbornanetrimethoxysilane, 2-norbornanetriethoxysilane, 2-norbornanemethyldimethoxysilane, trimethylphenoxysilane, methyltriphenoxysilane and the like.

The ethers are preferably dialkyl ethers and diether compounds represented by the following general formula:

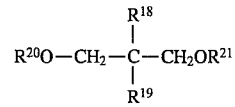

wherein $R^{18}$ to $R^{21}$ represent independently straight or branched chain alkyl, alicyclic, aryl, alkylaryl or arylalkyl groups having up to 20 carbon atoms; and $R^{18}$ and $R^{19}$ may be hydrogen atoms. Specific examples of the ether compounds include diethyl ether, dipropyl ether, diisopropyl ether, dibutyl ether, diamyl ether, diisoamyl ether, dineopentyl ether, dihexyl ether, dioctyl ether, methyl butyl ether, methyl isoamyl ether, ethyl isobutyl ether, 2,2-diisobutyl-1,3-dimethoxypropane, 2-isopropyl-2-isopentyl-1,3-dimethoxypropane, 2,2-bis-(cyclohexylmethyl)-1,3-dimethoxypropane, 2-isopropyl-2-(3,7-dimethyloctyl)-1,3-dimethoxypropane, 2,2-diisopropyl-1,3-dimethoxypropane, 2-isopropyl-2-cyclohexylmethyl-1,3-dimethoxypropane, 2,2-dicyclohexyl-1,3dimethoxypropane, 2-isopropyl-2-isobutyl-1,3-dimethoxypropane, 2,2-diisopropyl-1,3-dimethoxypropane, 2,2-dipropyl-1,3-dimethoxypropane, 2-isopropyl-2-cyclohexyl-1,3-dimethoxypropane, 2-isopropyl-2-cyclopentyl-1,3-dimethoxypropane, 2,2-dicyclopentyl-1,3-dimethoxypropane, 2-heptyl-2-pentyl-1,3-dimethoxypropane and the like.

Among these electron donative compounds, particularly preferable are organosilicon compounds represented by the general formula $R^{22}R^{23}Si(OR^{24})_2$ wherein $R^{22}$ represents a hydrocarbon group having 3 to 20 carbon atoms in which the carbon atom adjacent to Si is secondary or tertiary, which includes specifically branched alkyl groups such as isopropyl group, sec-butyl group, tert-butyl group, tert-amyl group and the like; cycloalkyl groups such as cyclopentyl group, cyclohexyl group and the like; cycloalkenyl groups such as cyclopentenyl group and the like; and aryl groups such as phenyl group, tolyl group and the like, and $R^{23}$ represents a hydrocarbon group having 1 to 20 carbon atoms, which includes specifically straight chain alkyl groups such as methyl group, ethyl group, propyl group, butyl group, pentyl group and the like; branched chain alkyl groups such as isopropyl group, sec-butyl group, tert-butyl group, tert-amyl group and the like; cycloalkyl groups such as cyclopentyl group cyclohexyl group and the like; cycloalkenyl groups such as cyclopentenyl group and the like; aryl groups such as phenyl group, tolyl group and the like; etc, and $R^{24}$ represents a hydrocarbon group having 1 to 20 carbon atoms, preferably a hydrocarbon group having 1 to 5 carbon atoms.

Specific examples of such an organosilicon compound used as the electron donative compound include diisopropyldimethoxysilane, diisobutyldimethoxysilane, di-tert-butyldimethoxysilane, tert-butylmethyldimethoxysilane, tert-butylethyldimethoxysilane, tert-butyl-n-propyldimethoxysilane, isobutylisopropylmethoxysilane, tert-butylisopropyldimethoxysilane, tert-butyl-n-butyldimethoxysilane, tert-butyl-isobutyldimethoxysilane, tert-butyl-sec-butyldimethoxysilane, dicyclopentyldimethoxysilane, cyclopentylisopropyldimethoxysilane, cyclopentylisobutyldimethoxysilane, cyclopentyl-tert-butyldimethoxysilane, dicyclohexyldimethoxysilane, cyclohexylmethyldimethoxysilane, cyclohexylethyldimethoxysilane, cyclohexylisopropyldimethoxysilane, cyclohexylisobutyldimethoxysilane, cyclohexyl-tert-butyldimethoxysilane, cyclohexylcyclopentyldimethoxysilane, cyclohexylphenyldimethoxysilane, diphenyldimethoxysilane, phenylmethyldimethoxysilane, phenylisopropyldimethoxysilane, phenylisobutyldimethoxysilane, phenyl-tert-butyldimethoxysilane, phenylcyclopentyldimethoxysilane, diisopropyldiethoxysilane, diisobutyldiethoxysilane, di-tert-butyldiethoxysilane, tert-butylmethyldiethoxysilane, dicyclopentyldiethoxysilane, dicycloheyxldiethoxysilane, cyclohexylmethyldiethoxysilane, cyclohexylethyldiethoxysilane, diphenyldiethoxysilane, phenylmethyldiethoxysilane, 2-norbornanemethyldimethoxysilane and the like.

(i) Method for polymerizing olefin

The α-olefin applicable to this invention is an α-olefin having 3 or more carbon atoms, and specific examples of the α-olefin includes straight chain monoolefins such as propylene, butene-1, pentene-1, hexene-1, heptene-1, octene-1, decene-1 and the like; branched monoolefins such as 3-methylbutene-1, 3-methylpentene-1, 4-methylpenten-1 and the like; vinylcyclohexane; and the like. These α-olefins may be used alone or even in combination of two or more. It is preferable to homopolymerize propylene or butene-1 or copolymerize a mixed olefin comprising propylene or butene-1 as the main component, and particularly preferable to homopolymerize propylene or copolymerize a mixed olefin comprising propylene as the main component. In the copolymerization in this invention, it is possible to use a mixture of ethylene and at least two members selected from the above α-olefins. Moreover, it is possible to use compounds having two or more unsaturated bonds such as conjugated dienes or non-conjugated dienes as comonomers in the copolymerization. Heteroblock copolymerization in which polymerization is effected in two or more stages can be easily conducted.

The feeding of each catalyst component to a polymerizer is not critical though it is necessary to feed them in an inert gas such as nitrogen, argon or the like in the water-free state.

The solid catalyst component (A), the organoaluminum compound (B) and the electron donative compound (C) may be fed separately or either two of them are previously contacted and then fed.

In this invention, it is possible to conduct polymerization of an olefin in the presence of the above catalyst; however, a preliminary polymerization as mentioned below may be effected before carrying out the above polymerization (the main polymerization).

The preliminary polymerization is carried out by feeding a small amount of an olefin in the presence of the solid catalyst component (A) and the organoaluminum compound (B), and it is preferable to conduct the preliminary polymerization in the slurry state. In order to form a slurry, a solvent is used which includes inert hydrocarbons such as propane, butane, isobutane, pentane, isopentane, hexane, heptane, octane, cyclohexane, benzene, toluene and the like. Also, in the formation of the slurry, a part or the whole of the inert hydrocarbon solvent may be replaced with a liquid olefin.

The amount of the organoaluminum compound (B) used in the preliminary polymerization can be selected from such a broad range as from 0.5 to 700 moles per mole of the titanium atom contained in the solid catalyst component; however, the amount is preferably 0.8 to 500 moles, more preferably 1 to 200 moles.

The amount of the olefin to be preliminarily polymerized is preferably 0.01 to 1,000 g, more preferably 0.05 to 500 g, and most preferably 0.1 to 200 g, per gram of the solid catalyst component.

The slurry concentration in the preliminary polymerization is preferably 1 to 500 g of the solid catalyst component/liter of the solvent, and particularly preferably 3 to 300 g of the solid catalyst component/liter of the solvent. The preliminary polymerization temperature is preferably −20° to +100° C., more preferably 0° to 80° C. The partial pressure of the olefin in the gas phase during the preliminary polymerization is preferably 0.01 to 20 kg/cm$^2$, more preferably 0.1 to 10 kg/cm$^2$; however, this does not apply to the olefin which is liquid at the preliminary polymerization pressure at the preliminary polymerization temperature. In addition, the preliminary polymerization time is not critical, and is preferably two minutes to fifteen hours.

In carrying out the preliminary polymerization, the feeding of the solid catalyst component (A), the organoaluminum compound (B) and the olefin may be effected either by a method in which the olefin is fed after the solid catalyst component (A) has been contacted with the organoaluminum compound (B) or by a method in which the organoaluminum compound (B) is fed after the solid catalyst component (A) has been contacted with the olefin. The feeding of the olefin may be effected either by such a method that the olefin is successively added while the pressure in the polymerizer is kept at the predetermined pressure or by a method in which the predetermined amount of the olefin is fed initially. In order to adjust the molecular weight of the polymer obtained, a chain transfer agent such as hydrogen or the like may be added.

In the preliminary polymerization of a small amount of the olefin in the presence of the solid catalyst component (A) and the organoaluminum compound (B), the electron donative compound (C) may be, if necessary, allowed to co-exist. The electron donative compound used is a part or the whole of the above-mentioned electron donative compound (C). The amount of the electron donative compound used is preferably 0.01 to 400 moles, more preferably 0.02 to 200 moles, and most preferably 0.03 to 100 moles, per mole of the titanium atom contained in the solid catalyst component (A), and the proportion thereof per mole of the organoaluminum compound (B) is preferably 0.003 to 5 moles, more preferably 0.005 to 3 moles and most preferably 0.01 to 2 moles.

The method of feeding the electron donative compound (C) in the preliminary polymerization is not critical, and the electron donating compound may be fed separately from the organoaluminum compound (B) or may be previously contacted with the organoaluminum compound (B) and then fed. Also, the olefin used in the preliminary polymerization may be the same as or different from the olefin to be used in the main polymerization.

After the preliminary polymerization has been conducted as mentioned above, or without conducting the preliminary polymerization, the α-olefin can be subjected to the main polymerization in the presence of the α-olefin polymerization catalyst system consisting essentially of the solid catalyst component (A), the organoaluminum compound (B) and the electron donative compound (C).

The amount of the organoaluminum compound (B) in the main polymerization can be selected from such a broad range as 1 to 1,000 moles per mole of the titanium atom contained in the solid catalyst component (A), and it is preferably in the range of 5 to 600 moles per mole of the solid catalyst component (A).

The amount of the electron donative compound (C) used in the main polymerization is preferably 0.1 to 2,000 moles, more preferably 0.3 to 1,000 moles and most preferably 0.5 to 800 moles, per mole of the titanium atom contained in the solid catalyst component (A), and the proportion of the electron donative compound (C) per mole of the organoaluminum compound (B) is preferably 0.001 to 5 moles, more preferably 0.005 to 3 moles and most preferably 0.01 to 1 mole.

The main polymerization can be carried out in a temperature range of from −30° C. to +300° C.; however, the temperature is preferably 20° to 180° C. The polymerization pressure is not critical; however, a pressure of preferably atmospheric pressure to 100 kg/cm$^2$, more preferably about 2 to about 50 kg/cm$^2$ is adopted from the industrial and economical points of view. The polymerization system may be either batchwise system or continuous system. The polymerization may be a slurry or solution polymerization in an inert hydrocarbon solvent such as propane, butane, isobutane, pentane, hexane, heptane or octane; a bulk polymerization using as a medium an olefin which is liquid at the polymerization temperature; or a gas phase polymerization.

In the main polymerization, a chain transfer agent such as hydrogen or the like may be added in order to control the molecular weight of the polymer produced.

DETAILED DESCRIPTION OF THE PREFERRED EMBODIMENTS

This invention is explained in more detail below referring to Examples and Comparative Examples; however, this invention should not be construed to be limited thereto. Incidentally, in the Examples, the methods for evaluating various physical properties of polymers were as follows.

(I) Xylene-solubles at 20° C. (referred to hereinafter as CXS)

In 200 ml of boiling xylene was dissolved 1 g of polymer powder. The resulting solution was gradually cooled to 50° C., then immersed in ice water bath to be cooled to 20° C. with stirring and allowed to stand at 20° C. for three hours; after which the polymer precipitated was removed by filtration. The xylene was removed by evaporation from the filtrate and the filtrate was then dried under reduced pressure at 60° C. to recover a polymer soluble in xylene at 20° C.

(II) Intrinsic viscosity (referred to hereinafter as [η])

Measures at 135° C. in tetralin.

EXAMPLE 1

(1) Synthesis of organomagnesium compound

A 1,000-ml flask equipped with a stirrer, a reflux condenser, a dropping funnel and a thermometer was purged with argon, and thereafter, 32.0 g of sliced magnesium for Grignard was poured thereinto. Into the dropping funnel were charged 120 g of butyl chloride and 500 ml of dibutyl ether, and about 30 ml of the resulting solution was dropped into the flask to start reaction. After the start of reaction, the remaining solution was further dropped at 50° C. over four hours to complete the dropping, after which the reaction was continued at 60° C. for a further one hour. Thereafter, the reaction mixture was cooled to room temperature and the solid contents were removed by filtration. The butylmagnesium chloride in the sampled filtrate was hydrolyzed with 1N sulfuric acid and subjected to back titration with 1N aqueous sodium hydroxide solution using phenolphthalein as an indicator to determine the concentration as 2.1 moles/liter.

(2) Synthesis of solid product

A 500-ml flask equipped with a stirrer and a dropping funnel was purged with argon and thereafter charged with 290 ml of hexane, 9.3 ml (9.3 g, 27 millimoles) of tetrabutoxytitanium, 8.5 ml (8.8 g, 32 millimoles) of diisobutyl phthalate and 79.1 ml (74.4 g, 357 millimoles) of tetraethoxysilane to form a uniform solution. Subsequently, 189 ml of the organomagnesium compound solution synthesized in (1) above was gradually dropped from the dropping funnel over two hours while the temperature in the flask was kept at 5° C. After completion of the dropping, the resulting mixture was stirred at room temperature for a further one hour and then subjected to solid-liquid separation at room temperature, after which the solids obtained were washed with three 300-ml portions of hexane and then with three 300-ml portions of toluene. Thereafter, 270 ml of toluene was added to the solids.

A part of the solid product slurry was sampled and subjected to composition analysis to find that the solid product contained 1.8% by weight of titanium atom, 0.5% by weight of the phthalic acid ester, 30.7% by weight of the ethoxy group and 3.3% by weight of the butoxy group. Also, the slurry concentration was 0.140 g/ml.

(3) Synthesis of ester-treated solids

A 200-ml flask equipped with a stirrer, a dropping funnel, a thermometer was purged with argon and then charged with 84 ml of the solid product-containing slurry obtained in (2) above, after which 12.1 ml of the supernatant was taken out and 7.8 ml (29 millimoles) of diisobutyl phthalate was added to the slurry. The resulting mixture was subjected to reaction at 95° C. for 30 minutes and thereafter subjected to solid-liquid separation. The solids obtained were washed with two 59-ml portions of toluene.

(4) Synthesis of solid catalyst component (activating treatment)

After completion of the washing in (3) above, 15.3 ml of toluene, 0.66 ml (2.5 millimoles) of diisobutyl phthalate, 1.2 ml (6.9 millimoles) of dibutyl ether and 23.4 ml (0.213 mole) of titanium tetrachloride were placed in the flask, and subjected to reaction at 95° C. for three hours. After completion of the reaction, the reaction mixture was subjected to solid-liquid separation at the same temperature, and the solids obtained were washed with two 59-ml portions of toluene at the same temperature. Subsequently, 12.0 ml of toluene, 1.2 ml (6.9 millimoles) of dibutyl ether and 11.7 ml (0.106 mole) of titanium tetrachloride were added to the solids and the resulting mixture was subjected to reaction at 95° C. for one hour. After completion of the reaction, the reaction mixture was subjected to solid-liquid separation at the same temperature, after which the solids obtained were washed with three 59-ml portions of toluene at the same temperature and thereafter with three 59-ml portions of hexane, and then dried under reduce pressure to obtain 8.1 g of a solid catalyst component.

The solid catalyst component obtained contained 1.4% by weight of titanium atom, 10.0% by weight of the phthalic acid ester, 0.5% by weight of the ethoxy group and 0.1% by weight of the butoxy group. The solid catalyst component was observed with a stereo-microscope to find that it was in the fine powder-free, good particle form.

(5) Polymerization of propylene

A 3-liter, agitation type, stainless steel autoclave was purged with argon, and charged with 2.6 millimoles of triethylaluminum, 0.26 millimole of cyclohexylethyldimethoxysilane and 4.0 mg of the solid catalyst component synthesized in (4) above, after which hydrogen corresponding to a partial pressure of 0.33 kg/cm$^2$ was introduced into the autoclave. Subsequently, 780 g of liquefied propylene/was charged into the autoclave, and the temperature of the autoclave was elevated to 80° C., at which temperature polymerization was conducted for one hour. After completion of the polymerization, unreacted monomer was purged from the autoclave. The polymer produced was dried at 60° C. under reduced pressure for two hours to obtain 105 g of polypropylene powder.

Accordingly, the yield of polypropylene per gram of the solid catalyst component was such that PP/Cat=26,300 (g/g). Also, the proportion of the 20° C. xylene-soluble component to the total polymer yield (CXS) was 0.72% by weight and the intrinsic viscosity [η] of the polymer was 1.91.

Comparative Example 1

(1) Synthesis of solid product

A 500-ml flask equipped with a stirrer and a dropping funnel was purged with argon and thereafter charged with 240 ml of hexane, 5.4 g (15.8 millimoles) of tetrabutoxytitanium and 61.4 g (295 millimoles) of tetraethoxysilane to form a uniform solution. Subsequently, 150 ml of the organomagnesium compound synthesized in Example 1 (1) was gradually dropped from the dropping funnel over four hours while the temperature in the autoclave was maintained at 5° C. After completion of the dropwise addition, the contents of the flask were stirred at room temperature for a further one hour and then subjected to solid-liquid separation, after which the solids obtained were washed with three 240-ml portions of hexane and then dried under reduced pressure to obtain 45.0 g of a brown solid product.

The solid product contained 1.7% by weight of titanium atom, 33.8% by weight of the ethoxy group and 2.9% by weight of the butoxy group.

In a wide angle X-ray diffraction pattern of the solid product by Cu-Kα rays, no clear diffraction peak was found at all and the structure of the solid product was noncrystalline.

(2) Synthesis of ester-treated solids

A 100-ml flask was purged with argon and thereafter charged with 6.5 g of the solid product synthesized in (1) above, 16.2 ml of toluene and 4.3 ml (16 millimoles) of diisobutyl phthalate, after which the resulting mixture was subjected to reaction at 95° C. for one hour. After the reaction, the reaction mixture was subjected to solid-liquid separation and the solids obtained were washed with three 33-ml portions of toluene.

(3) Synthesis of solid catalyst component (activating treatment)

After completion of the washing in (2) above, the flask was charged with 16.2 ml of toluene, 0.36 ml (1.3 millimoles) of diisobutyl phthalate, 2.2 ml (13 millimoles) of dibutyl ether and 38.0 ml (346 millimoles) of titanium tetrachloride, after which the resulting mixture was subjected to reaction at 95° C. for three hours. After completion of the reaction, the reaction mixture was subjected to solid-liquid separation at 95° C. and then the solids obtained were washed with two 33-ml portions of toluene at the same temperature. The above-mentioned treatment with the mixture of diisobutyl phthalate with dibutyl ether and titanium tetrachloride was repeated once again under the same conditions, and the solids were washed with three 33-ml portions of hexane to obtain 5.0 g of an ocherous solid catalyst component.

The solid catalyst component contained 2.1% by weight of titanium atom, 19.9% by weight of magnesium atom and 12.7% by weight of the phthalic acid ester.

(4) Polymerization of propylene

In the same manner as in the polymerization of propylene in Example 1 (5), except that the solid catalyst component obtained in (3) above was used, propylene was polymerized.

The polymerization results obtained were such that PP/Cat=24,100 (g/g), CXS=0.94 (% by weight) and [η]= 1.95. The polymerization conditions and polymerization results are shown in Table 1. In this Comparative Example, the solid catalyst component of this invention was not used in the polymerization, the stereoregularity was inferior to that of the examples in this invention.

EXAMPLE 2

(1) Synthesis of solid product

The same procedure as in Example 1 (2) was repeated, except that the amount of tetrabutoxytitanium was changed to 7.5 ml (7.5 g, 22 millimoles), the amount of diisobutyl phthalate was changed to 2.5 ml (2.6 g, 9.3 millimoles), the amount of tetraethoxysilane was changed to 74.8 ml (70.3 g, 338 millimoles) and the amount of the organomagnesium compound solution was changed to 173 ml, to synthesize a solid product.

A part of the solid product slurry was sampled and subjected to composition analysis to find that the solid product contained 1.8% by weight of titanium atom, 0.1% by weight of the phthalic acid ester, 35.0% by weight of the ethoxy group and 3.2% by weight of the butoxy group.

(2) Synthesis of ester-treated solids

Under the same conditions as in Example 1 (3), the synthesis of ester-treated solids was conducted.

(3) Synthesis of solid catalyst component (activating treatment)

In the same manner as in Example 1 (4), except that the activating treatment and washing with toluene were conducted at 105° C., to synthesize a solid catalyst component.

The solid catalyst component contained 1.5% by weight of titanium atom, 8.9% by weight of the phthalic acid ester, 0.4% by weight of the ethoxy group and 0.1% by weight of the butoxy group. Also, the solid catalyst component was observed by a stereomicroscope to find that the solid catalyst component was in the fine powder-free, good particle form.

(4) Polymerization of propylene

In the same manner as in the polymerization of propylene in Example 1 (e), except that the solid catalyst component obtained in (3) above was used, to polymerize propylene.

The polymerization results obtained were such that PP/Cat=30,000 (g/g), CXS=0.74 (% by weight) and [η]= 2.01. The polymerization conditions and polymerization results are shown in Table 1.

EXAMPLE 3

(1) Synthesis of solid product

In the same manner as in Example 1 (2), except that the amount of tetrabutoxytitanium was changed to 7.5 ml (7.5 g, 22 millimoles), the amount of diisobutyl phthalate was changed to 3.8 ml (4.0 g, 14 millimoles), the amount of tetraethoxysilane was changed to 74.8 ml (70.3 g, 338 millimoles) and the amount of the organomagnesium compound solution was changed to 174 ml, to synthesize a solid product.

A part of the solid product slurry was sampled and subjected to composition analysis to find that the solid product contained 1.7% by weight of titanium atom, 0.1% by weight of the phthalic acid ester, 34.2% by weight of the ethoxy group and 3.2% by weight of the butoxy group.

(2) Synthesis of ester-treated solids

Ester-treated solids were synthesized under the same conditions as in Example 1 (3).
(3) Synthesis of solid catalyst component (activating treatment)

In the same manner as in Example 1 (4), except that the activating treatment and washing with toluene were conducted at 105° C. to synthesize a solid catalyst component.

The solid catalyst component contained 1.7% by weight of titanium atom, 10.0% by weight of the phthalic acid ester, 0.4% by weight of the ethoxy group and 0.1% by weight of the butoxy group. Also, the solid catalyst component was observed by a stereomicroscope to find that the component was in the fine powder-free, good particle form.
(4) Polymerization of propylene In the same manner as in the polymerization of propylene in Example 1 (5), except that the solid catalyst component obtained in (3) above was used, to polymerize propylene.

The polymerization results obtained were such that PP/Cat=37,200 (g/g), CXS=0.73 (% by weight) and [η]= 2.02. The polymerization conditions and polymerization results are shown in Table 1.

EXAMPLE 4

(1) Synthesis of solid product

In the same manner as in Example 1 (2), except that the amount of tetrabutoxytitanium was changed to 9.9 ml (9.9 g, 29 millimoles), the amount of diisobutyl phthalate was changed to 8.5 ml (8.8 g, 32 millimoles), the amount of tetraethoxysilane was changed to 78.7 ml (74.0 g, 355 millimoles) and the amount of the organomagnesium compound solution to 189 ml, to synthesize a solid product.

A part of the solid product was sampled and subjected to composition analysis to find that the solid product contained 1.9% by weight of titanium atom, 0.4% by weight of the phthalic acid ester, 31.3% by weight of the ethoxy group and 3.5% by weight of the butoxy group.
(2) Synthesis of ester-treated solids Ester-treated solids were synthesized under the same conditions as in Example 1 (3).
(3) Synthesis of solid catalyst component (activating treatment)

In the same manner as in Example 1 (4), except that the amount of the diisobutyl phthalate was changed to 0.1 ml per gram of the solid product and the activating treatment and washing with toluene were conducted at 105° C., to synthesize a solid catalyst component.

The solid catalyst component contained 1.3% by weight of titanium atom, 10.2% by weight of the phthalic acid ester, 0.3% by weight of the ethoxy group and 0.1% by weight of the butoxy group. Also, the solid catalyst component was observed by a stereomicroscope to find that the component was in the fine powder-free, good particle form.
(4) Polymerization of propylene In the same manner as in the polymerization of propylene in Example 1 (5), except that the solid catalyst component obtained in (3) above was used, to polymerize propylene.

The polymerization results obtained were such that PP/Cat=32,700 (g/g), CXS=0.52 (% by weight) and [η]= 1.83. The polymerization conditions and polymerization results are shown in Table 1.

EXAMPLE 5

(1) Synthesis of solid product

In the same manner as in Example 1 (2), except that the amount of the tetrabutoxytitanium was changed to 7.5 ml (7.5 g, 22 millimoles), the amount of the diisobutyl phthalate to 2.5 ml (2.6 g, 9.3 millimoles), the amount of the tetraethoxysilane was changed to 73.8 ml (68.9 g, 331 millimoles) and the amount of the organomagnesium compound solution to 168 ml, to synthesize a solid product, and the solid product was then heated at 105° C. for one hour.

A part of the solid product was sampled and then subjected to composition analysis to find that the solid product contained 1.9% by weight of titanium atom, 0.2% by weight of the phthalic acid ester, 35.6% by weight of the ethoxy group and 2.7% by weight of the butoxy group.
(2) Synthesis of ester-treated solids A 100-ml flask was purged with argon and charged with 6.5 g of the solid product obtained in (1) above, 16.2 ml of toluene and 5.5 ml (21 millimoles) of diisobutyl phthalate, after which the resulting mixture was subjected to reaction at 95° C. for one hour. After the reaction, the reaction mixture was subjected to solid-liquid separation and the solids obtained were washed with three 33-ml portions of toluene.
(3) Synthesis of solid catalyst component (activating treatment)

In the same manner as in Example 1 (4), except that the activating treatment and washing with toluene were conducted at 105° C. to synthesize a solid catalyst component.

The solid catalyst component contained 1.9% by weight of titanium atom, 12.3% by weight of the phthalic acid ester, 0.4% by weight of the ethoxy group and 0.2% by weight of the butoxy group. Also, the solid catalyst component was observed by a stereomicroscope, to find that the component was in the fine powder-free, good particle form.
(4) Polymerization of propylene In the same manner as in the polymerization of propylene in Example 1 (5), except that the solid catalyst component obtained in (3) above was used and tertbutylmethyldimethoxysilane was substituted for the cyclohexylethyldimethoxysilane to polymerize propylene.

The polymerization results obtained were such that PP/Cat=36,300 (g/g), CXS=0.72 (% by weight) and [η]= 2.11. The polymerization conditions and polymerization results are shown in Table 1.

EXAMPLE 6

In the same manner as in the polymerization of propylene in Example 5 (4), except that tert-butyl-n-propyldimethoxysilane was substituted for the tertbutylmethyldimethoxysilane to polymerize propylene.

The polymerization results obtained were such that PP/Cat=45,000 (g/g), CXS=0.61 (% by weight) and [η]= 2.42. The polymerization conditions and polymerization results are shown in Table 1.

TABLE 1

| | Solid catalyst component | | Polymerization results | | |
|---|---|---|---|---|---|
| | Conditions for solid product | Activating treatment conditions | | | |
| | synthesis DiBP/Ti* | Temp. (°C.) | PP/Cat (g/g) | CXS (% wt.) | [η] |
| Example 1 | 1.2 | 95 | 26,300 | 0.72 | 1.91 |
| Comp. Ex. 1 | None | 95 | 24,100 | 0.94 | 1.95 |
| Example 2 | 0.4 | 105 | 30,000 | 0.74 | 2.01 |
| Example 3 | 0.6 | 105 | 37,200 | 0.73 | 2.02 |
| Example 4 | 1.1 | 105 | 32,700 | 0.52 | 1.83 |

TABLE 1-continued

| | Solid catalyst component | | | | |
|---|---|---|---|---|---|
| | Conditions for solid product | Activating treatment conditions | Polymerization results | | |
| | synthesis DiBP/Ti* | Temp. (°C.) | PP/Cat (g/g) | CXS (% wt.) | [η] |
| Example 5 | 0.4 | 105 | 36,300 | 0.72 | 2.11 |
| Example 6 | 0.4 | 105 | 45,000 | 0.61 | 2.42 |

Note:
DiBP/Ti = Diisobutyl phthalate/tetrabutoxy-titanium (mole ratio)

What is claimed is:

1. An α-olefin polymerization catalyst system consisting essentially of:

(A) a trivalent titanium compound-containing solid catalyst component prepared by reducing a titanium compound, represented by the general formula $Ti(OR^1)_a X_{4-a}$ in which $R^1$ represents a hydrocarbon group having 1 to 20 carbon atoms; X represents a halogen atom; and a represents a numeral satisfying $0<a\leq4$, after forming a mixture of the titanium compound, Si—O bond-containing organosilicon compound and an ester compound (a), with an organomagnesium compound to obtain a solid product, treating the solid product with an ester compound (b) to obtain an ester-treated solid product, and treating the ester-treated solid product with a mixture of an ether compound and titanium tetrachloride or a mixture of an ether compound, titanium tetrachloride and an ester compound (c), wherein the ester compounds (a), (b), and (c) may be the same or different from one another, (B) an organoaluminum compound and (C) an electron donative compound.

2. The α-olefin polymerization catalyst system according to claim 1, wherein the titanium compound is a tetraalkoxytitanium compound.

3. The α-olefin polymerization catalyst system according to claim 1, wherein the titanium compound is tetramethoxytitanium, tetraethoxytitanium, tetrabutoxytitanium, or tetraphenoxytitanium.

4. The α-olefin polymerization catalyst system according to claim 1, wherein the Si—O bond-containing organosilicon compound is a compound represented by the general formula $Si(OR^2)_m R^3_{4-m}$, $R^4(R^5_2SiO)_p SiR^6_3$ or $(R^7_2SiO)_q$ wherein $R^2$ represents a hydrocarbon group having 1 to 20 carbon atoms, each of $R^3$, $R^4$, $R^5$, $R^6$ and $R^7$ represents a hydrocarbon group having 1 to 20 carbon atoms or a hydrogen atom, m represents a numeral satisfying $0<m\leq4$, p represents an integer of 1 to 1,000 and q represents an integer of 2 to 1,000.

5. The α-olefin polymerization catalyst system according to claim 1, wherein the Si—O bond-containing organosilicon compound is a tetraalkoxysilane compound.

6. The α-olefin polymerization catalyst system according to claim 1, wherein the ester compounds (a), (b), and (c) are independently selected from alkyl esters of mono- or polycarboxylic acids.

7. The α-olefin polymerization catalyst system according to claim 6, wherein the alkyl esters of mono- or polycarboxylic acids are an aliphatic carboxylic acid ester, an olefinic carboxylic acid ester, an alicyclic carboxylic acid ester or an aromatic carboxylic acid ester.

8. The α-olefin polymerization catalyst system according to claim 1, wherein the ester compounds (a), (b), and (c) are unsaturated aliphatic carboxylic acid esters or phthalic acid esters.

9. The α-olefin polymerization catalyst system according to claim 1, wherein the ester compounds (a), (b), and (c) are phthalic acid diesters.

10. The α-olefin polymerization catalyst system according to claim 1, wherein the organomagnesium compound is a Grignard compound represented by the general formula $R^8MgX$ in which $R^8$ represents a hydrocarbon group having 1 to 20 carbon atoms and X is a halogen atom, or a dialkylmagnesium compound or diarylmagnesium compound represented by the general formula $R^9R^{10}Mg$ in which each of $R^9$ and $R^{10}$ represents a hydrocarbon group having 1 to 20 carbon atoms.

11. The α-olefin polymerization catalyst system according to claim 1, wherein the organoaluminum compound (B) is a compound represented by the formula $R^{11}_\gamma AlY_{3-\gamma}$ or $R^{12}R^{13}Al-O-AlR^{14}R^{15}$ in which each of $R^{11}$ to $R^{15}$ represents a hydrocarbon group having 1 to 20 carbon atoms, Y represents a halogen atom, a hydrogen atom or an alkoxy group and γ represents a numeral satisfying $2\leq\gamma\leq3$.

12. The α-olefin polymerization catalyst system according to claim 1, wherein the organoaluminum compound (B) is a trialkylaluminum, a mixture of a trialkylaluminum and a dialkylaluminum halide or an alkylaluminoxane.

13. The α-olefin polymerization catalyst system according to claim 1, wherein the amount of the organoaluminum compound (B) used is 0.5 to 1,000 moles per mole of the titanium atom in the solid catalyst component (A).

14. The α-olefin polymerization catalyst system according to claim 1, wherein the electron donative compound (C) is an inorganic acid ester or an ether.

15. The α-olefin polymerization catalyst system according to claim 14, wherein the inorganic acid ester is an organosilicon compound represented by the general formula $R^{16}_n Si(OR^{17})_{4-n}$ in which $R^{16}$ represents a hydrocarbon group having 1 to 20 carbon atoms or a hydrogen atom, $R^{17}$ represents a hydrocarbon group having 1 to 20 carbon atoms, $R^{16}$ and $R^{17}$ may be different from each other in the same molecule, and n represents a numeral satisfying $0\leq n\leq4$.

16. The α-olefin polymerization catalyst system according to claim 15, wherein the organosilicon compound is represented by the general formula $R^{22}R^{23}Si(OR^{24})_2$ in which $R^{22}$ represents a hydrocarbon group having 3 to 20 carbon atoms in which the carbon atom adjacent to Si is secondary or tertiary, $R^{23}$ represents a hydrocarbon group having 1 to 20 carbon atoms and $R^{24}$ represents a hydrocarbon group having 1 to 20 carbon atoms.

17. A process for producing an α-olefin polymer which comprises the steps of:

(1) preparing a trivalent titanium compound-containing solid catalyst component by reducing a titanium compound, represented by the general formula $Ti(OR^1)_a X_{4-a}$ in which $R^1$ represents a hydrocarbon group having 1 to 20 carbon atoms; x represents a halogen atom; and a represents a numeral satisfying $0<a\leq4$, after forming a mixture of the titanium compound, Si—O bond-containing organosilicon compound and an ester compound (a), with an organmagnesium compound to obtain a solid product, treating the solid product with an ester compound (b) to obtain an ester-treated solid product, and treating the ester-treated solid product with a mixture of an ether compound and titanium tetrachloride or a mixture of an ether compound, titanium tetrachloride and ester compound (c), wherein the ester compounds (a), (b), and (c)

may be the same or different from one another to obtain (A) a trivalent titanium compound-containing solid catalyst component and (2) homopolymerizing or copolymerizing at least one α-olefin in the co-presence of (A), (B) an organoaluminum compound, and (C) an electron donative compound.

18. The process for producing an α-olefin polymer according to claim 17 wherein said at least one α-olefin has 3 or more carbon atoms.

19. A trivalent titanium compound containing solid catalyst component for an α-olefin polymerization catalyst system prepared by:

reducing a titanium compound, represented by the general formula $Ti(OR^1)_a X_{4-a}$ in which $R^4$ represents a hydrocarbon group having 1 to 20 carbon atoms; X represents a halogen atom; and a represents a numeral satisfying $0 < a \leqq 4$, after forming a mixture of the titanium compound, Si—O bond-containing organosilicon compound and an ester compound (a), with an organmagnesium compound to obtain a solid product, treating the solid product with an ester compound (b) to obtain an ester-treated solid product, and treating the ester-treated solid product with a mixture of an ether compound and titanium tetrachloride or a mixture of an ether compound, titanium tetrachloride and an ester compound (c), wherein the ester compounds (a), (b), and (c) may be the same or different from one another.

20. A process for preparing a trivalent titanium compound-containing solid catalyst component for an α-olefin polymerization catalyst system which comprising the steps of:

reducing a titanium compound, represented by the general formula $Ti(OR^1)_a X_{4-a}$ in which $R^1$ represents a hydrocarbon group having 1 to 20 carbon atoms; X represents a halogen atom; and a represents a numeral satisfying $0 < a \leqq 4$, after forming a mixture of the titanium compound Si—O bond-containing organosilicon compound and an ester compound (a), with an organmagnesium compound and to obtain a solid product, treating the solid product with an ester compound (b) to obtain an ester-treated solid product, and treating the ester-treated solid product with a mixture of an ether compound and titanium tetrachloride or a mixture of an ether compound, titanium tetrachloride and an ester compound (c), wherein the ester compounds (a), (b), and (c) may be the same or different from one another.

21. The process for preparing a trivalent titanium compound-containing solid catalyst component according to claim 20, wherein the molar ratio of the organosilicon compound to the titanium compound falls within the range of from 5:1 to 25:1, the molar ratio of the ester compound (a) to the titanium compound falls within the range of from 0.2:1 to 3:1, and the molar ratio of the sum of the titanium compound and the organosilicon compound to the organomagnesium compound falls within the range of from 0.5:1 to 2.0:1.

22. The process for preparing a trivalent titanium compound-containing solid catalyst component according to claim 20, wherein the step of treating the ester-treated solid product comprises; previously preparing a mixture of the ether compound and titanium tetrachloride to obtain the previously preparing mixture and adding the previously prepared mixture of the ether compound and titanium tetrachloride to the ester-treated solid product.

23. The process for preparing a trivalent titanium compound-containing solid catalyst component according to claim 20, wherein the molar ratio of the ether compound to the titanium contained in the ester-treated solid product falls within the range of from 1:1 to 20:1, the molar ratio of titanium tetrachloride to the titanium contained in the ester-treated solid product falls within the range of from 10:1 to 300:1, and the molar ratio of titanium tetrachloride to the ether compound falls within the range of from 2:1 to 50:1.

\* \* \* \* \*